July 20, 1965  P. G. BILLHORN  3,195,513
ADJUSTABLE HOG CRATE
Filed Jan. 24, 1964  3 Sheets-Sheet 1

Paul G. Billhorn
INVENTOR.

BY Clarence A. O'Brien
and Harvey B. Jacobson
Attorneys

July 20, 1965   P. G. BILLHORN   3,195,513
ADJUSTABLE HOG CRATE
Filed Jan. 24, 1964   3 Sheets-Sheet 2

Paul G. Billhorn
INVENTOR.

BY *Clarence A. O'Brien*
*and Harvey B. Jacobson*
Attorneys

July 20, 1965 P. G. BILLHORN 3,195,513
ADJUSTABLE HOG CRATE
Filed Jan. 24, 1964 3 Sheets-Sheet 3
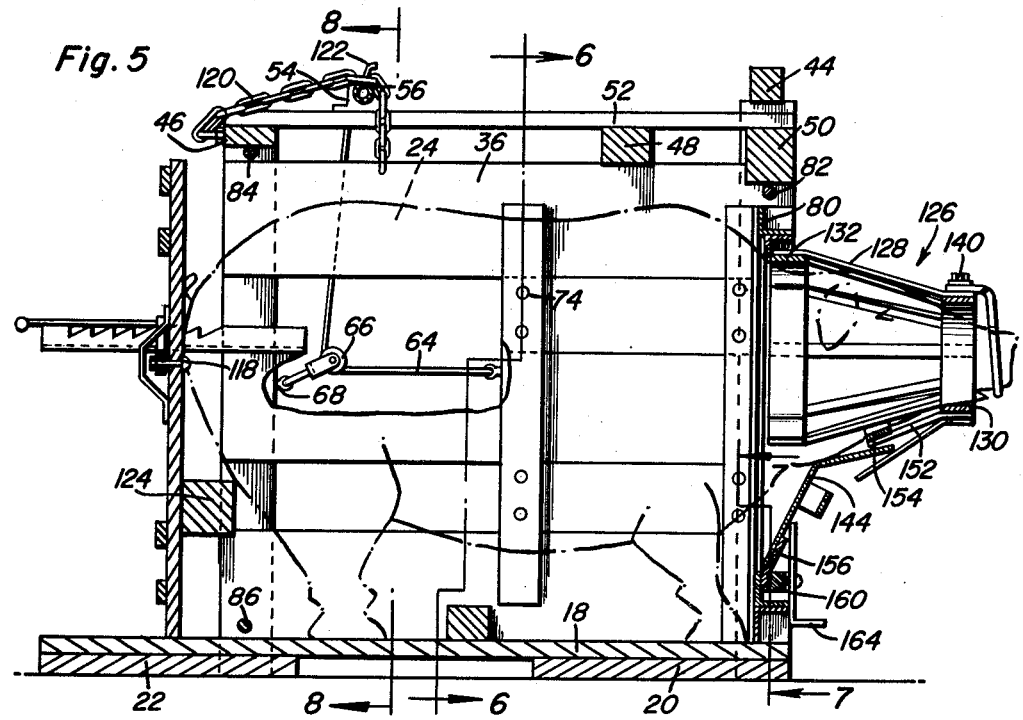
Paul G. Billhorn
INVENTOR.
BY *[signatures]*
*Attorneys*

United States Patent Office 3,195,513
Patented July 20, 1965

3,195,513
ADJUSTABLE HOG CRATE
Paul G. Billhorn, Rte. 3, Manchester, Iowa
Filed Jan. 24, 1964, Ser. No. 339,990
12 Claims. (Cl. 119—99)

The present invention generally relates to a hog crate that is portable in nature and particularly constructed for the purpose of easier handling of hogs when vaccinating, blood testing, ringing or for other various purposes where it is desirable to confine the hog and retain him in immobile condition.

An object of the present invention is to provide a hog crate that is not only portable in nature, but also is simple in construction, strong, long lasting and durable, efficient in operation and relatively inexpensive to manufacture.

Another object of the present invention is to provide a hog crate including an adjustable end gate which may be orientated in a plurality of positions together with a longitudinally movable neck-receiving means which may be retracted by a winch mechanism for enabling the hog crate to receive and effectively restrain hogs of different lengths.

Still another object of the present invention is to provide a hog crate having a transverse abutment at the rear thereof to prevent the hog from sitting down when in the crate.

Another important feature of the present invention is to provide a neck or head-receiving door at the head end of the hog crate which may be pivoted to an open position for enabling easier egress of the hog from the crate. The neck-receiving end gate is provided with an opening for enabling access to the throat of the hog in order to take blood for testing and a shield is provided to close the opening while the hog is being placed in the crate so that his nose cannot extend through the opening. The shield is held in place so that it can be easily removed after the hog has been positioned in the crate.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 5 is a longitudinal, sectional view taken substantially upon a plane passing along section line 5—5 of FIGURE 4 illustrating the structural features of the invention in their relationship for restraining a hog within the crate;

FIGURE 6 is a transverse, sectional view taken substantially upon a plane passing along section line 6—6 of FIGURE 5 illustrating further structural details of the hog crate;

Figure 8:
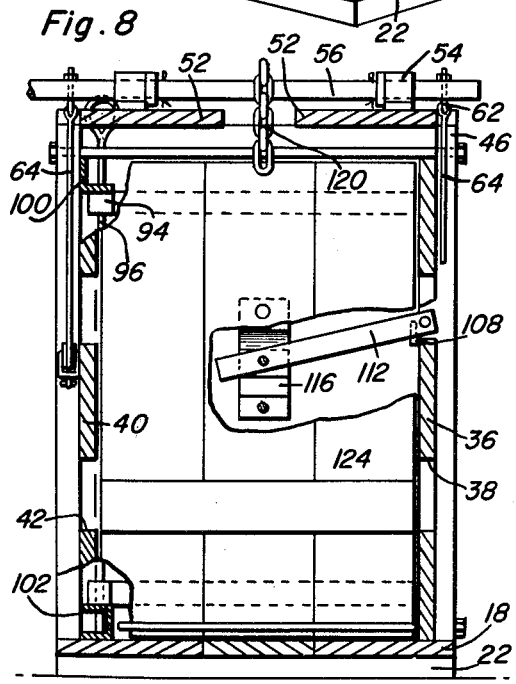

FIGURE 7 is a detailed sectional view taken substantially upon a plane passing along section line 7—7 of FIGURE 5 illustrating further structural details of the invention including the pivotal mounting means for the head end gate of the crate; and FIGURE 8 is a transverse, sectional view taken substantially upon a plane passing along section line 8—8 of FIGURE 5 illustrating further structural details of the hog crate including the tail end gate.

Referring now specifically to the drawings, the numeral 10 generally designates the hog crate of the present invention which includes a main hollow enclosure 12 having a head end gate 14 at one end thereof and a tail end gate 16 at the other end thereof for selectively closing the ends of the hog crate.

The main enclosure 12 includes a floor 18 supported in slightly elevated position by transverse bottom members 20 and 22. As illustrated in several of the figures, the floor 18 extends rearwardly beyond the rear end of the housing or enclosure 12 in order to provide an even support for the hog 24 even though the hog may be longer than the enclosure 12 and the tail end gate 16 is disposed in its rearmost position thereby properly orientating the hog 24 in the hog crate 10.

Figure 1:
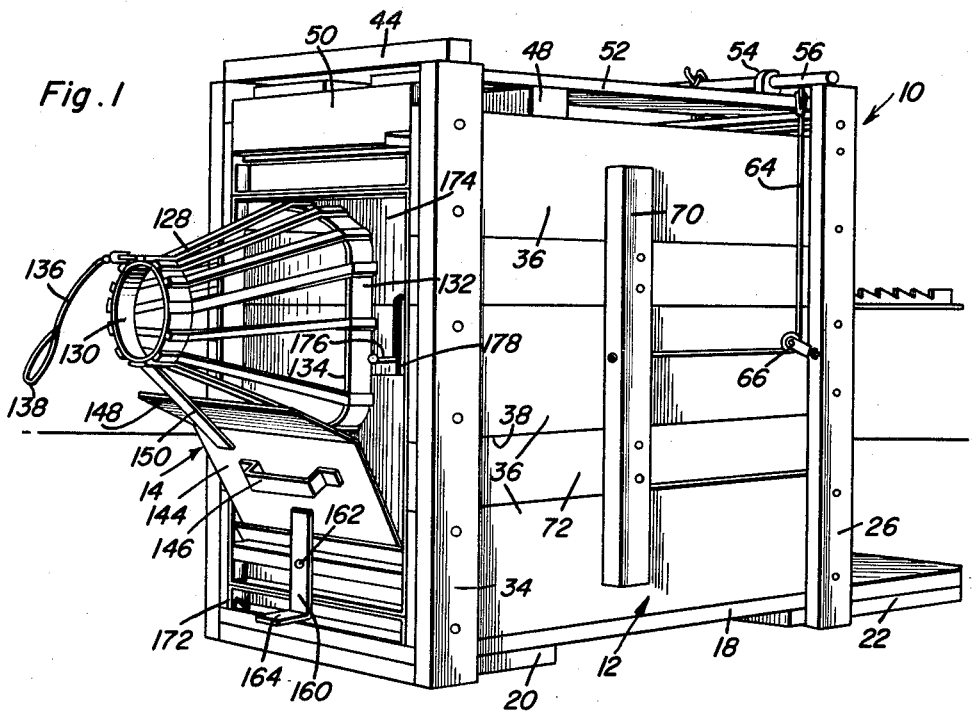
FIGURE 1 is a perspective view of the hog crate of the present invention as viewed from the front end thereof and illustrating the structure for receiving the head portion of the hog.

Upstanding from the bottom 18 are rear corner posts 26 disposed in transverse spaced relation to each other and a single forward post 28 which is spaced rearwardly from the forward end of the crate with the post 28 being only on one side of the crate. At the forward end of the crate, one side of the crate is provided with a sectional front post 30 with an omitted area 32 intermediate the ends thereof. On the opposite side of the crate, there is a continuous front corner post 34 as illustrated in FIGURE 1.

Interconnecting the front corner post 34 and one of the rear corner posts 26 is a plurality of vertically spaced side boards 36 which are rigidly affixed to the posts 34 and 26, respectively, with the side boards 36 being in mutually spaced relationship thus defining longitudinal spaces 38 therebetween. On the opposite side of the crate, a plurality of vertical side boards 40 are connected to the post 26 and also connected to the post 28. The sectional forward post 30 is connected with the uppermost and lowermost side boards 40, respectively. Thus, the side boards 40 also form longitudinal spaces 42 therebetween.

Interconnecting the uppermost end of the front corner post 34 and the uppermost end of the upper section of the sectional post 30 is a transverse top frame member 44. Extending between the upper ends of the rear posts 26 is a transverse top member 46 and attached to the upper end of the post 28 and extending to the top edge of the side board 36 on the opposite side of the crate is another transverse top member 48. Also, a transverse top member 50 is disposed between the upper end portion of the crate with this top member 50 being disposed between the adjacent surfaces of the uppermost side boards 36 and 40 as illustrated in FIGURE 1. The transverse top frame members 46, 48 and 50 support a pair of horizontally disposed top boards 52 which are secured to the top members and extend under the top member 44. The rear end portions of the boards 52 support a pair of bearings or journal blocks 54 for a transverse shaft 56 which extends across the top of the hog crate adjacent the rear end thereof with one end of the shaft having an offset crank arm 58 with a handle 60 rotatably mounted thereon.

Adjacent each end of the shaft 56, there is attached a a diametric bolt 62 which may conveniently be an eyebolt having one end of a flexible rope or cable 64 attached thereto. The cable 64 extends downwardly generally parallel with the rear post 26 and through a pully and block assembly 66 mounted on the forward surface of the rear post 26 by an eyebolt 68 or the like. The cable assembly is the same on both sides of the shaft and in each instance, the cable 64 extends forwardly alongside of the central side board and is attached to the center of a vertically disposed sliding post 70 which is sufficiently long that it bridges both of the spaces 42 between the side boards 40 and on the opposite side, the similar sliding post 70 is sufficiently long that it bridges both of the spaces 38 between the side boards 36. Attached to the sliding posts 70 is a pair of forwardly extending longitudinal slide members 72 are slidable in the spaces 38 and 42, respectively, on the opposite sides of the hog crate. Thus, when the handle 60 is rotated, the slide posts 70 and the slides 72 may be moved longitudinally inwardly or towards the rear of the hog crate. When the cable is unwound from the shaft at each end thereof, the posts 70 and the slides 72 may be moved outwardly by hand, away from the tail end of the hog crate.

The slides slides 72 are connected with a sliding post 74 disposed interiorly of the side boards 36 and 40, respectively, in opposed relation to the posts 70 for enabling more effective guiding action of the sliding assembly during reciprocation thereof. A similar interconnecting post 76 may be attached to the slides 72 adjacent the forward ends thereof which will abuttingly engage vertically disposed angle iron members 78 and the forward end of the hog crate. The vertically disposed angle iron members 78 are interconnected by transverse angle iron members 80 all of which combine to form a rigid framework for the head end gate 14 and all of this structure will move longitudinally when the slide posts 70 and 74 are reciprocated along the length of the side boards 36 and 40.

Figure 2:
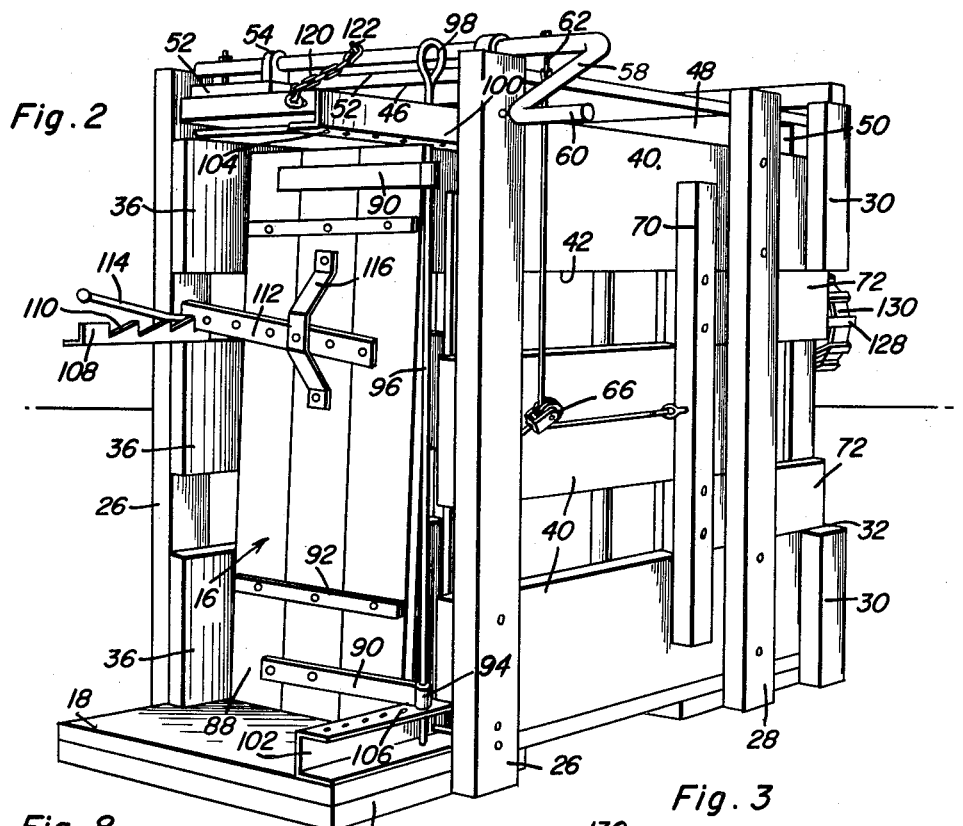
FIGURE 2 is a rear perspective view of the hog crate of the present invention illustrating the rear end gate thereof.

As illustrated in FIGURE 2, the portion of the side board 40 forwardly of the post 28 is omitted to provide better access to the hog when taking a blood sample, especially when the head in the gate is in its forward position. Also, a transversely extending reinforcing tie rod 82 extends between the front corner post 34 and the upper section of the post 30 with the transverse tie rod being just below the top frame member 50 as illustrated in FIGURE 5.

There are also transverse tie rods 84 and 86 interconnecting the upper and lower ends of the rear corner posts 26 respectively for further rigidifying the hog crate.

The rear gate 16 includes a plurality of separate boards 88 that coact to form a solid panel having hinge straps 90 attached thereto adjacent the upper and lower ends. Also interconnecting the boards 88 are transverse stringers 92 which are disposed inwardly of the hinge straps 90. Each of the hinge straps 90 terminates in a cylindrical sleeve 94 at the end thereof generally slightly outwardly from the edge of the tail end gate 16 for receiving an elongated hinge rod 96 having an enlarged loop shaped handle 98 on the upper end thereof which extends down through an apertured top rail 100 and an apertured bottom rail 102. The apertures in the top rail 100 are longitudinally spaced as at 104 while the apertures in the bottom rail are spaced as indicated by numeral 106. The bottom rail 102 is of channel-shaped configuration with the apertures 106 being in the supper flange thereof and the bottom end of the hinge rod 96 resting on the inner surface of the bottom flange of the channel-shaped rail 102. Thus, by withdrawing the hinge rod 96, the tail end gate 16 may be shifted longitudinally of the hog crate insofar as the pivot axis therefor is concerned.

Attached to the hog crate is a longitudinally extending latch member 108 having a plurality of notches 110 formed in the vertical flange thereof for receiving the bottom edge of a latch bar 112 having a handle 114 attached to the outer end thereof and being pivotally supported from the end gate 16 by a generally U-shaped bracket 116 and a pivot pin or bolt 118 which extends only through the end gate 16 as illustrated in FIGURE 5. The bar 112 may have longitudinally spaced apertures therein for varying the position of the bar 112 in relation to the end gate and also, the U-shaped mounting bracket 116 may serve as a handle for manipulating the end gate either as it swings about a vertical axis formed by the hinge rod 96 or it is actually lifted and moved rearwardly to a rearmost position depending upon the length of the hog. The latch member 108 as well as the rails 100 and 102 are bolted or otherwise secured to the inside of the crate and extend longitudinally rearward therefrom to give the end gate additional different positions for the length desired. As illustrated, the floor extends out in back of the crate for this purpose and the gate will operate in substantially the same manner regardless of its position with the latch bar 112 engaging one of the notches 110 for retaining the end gate 16 in close position.

While observing the rear portion of the crate, a latch chain 120 is anchored to the top cross member 46 by any suitable means and one of the links thereof will engage a radial projection 122 on the transverse shaft 56 for limiting the rotational movement of the shaft in one direction so that when the front gate is drawn rearwardly, the chain will serve to retain the front gate in its rearmost position.

Also as illustrated in FIGURE 5, the end gate 16 is provided with a transverse member 124 secured thereto which is preferably four inches by four inches and its purpose is to keep the hog 24 from sitting down so that the various operations to be performed on the hog may be more easily carried out.

The front end gate 14 is provided with a neck or head-receiving projection 126 in the form of a plurality of converging rods 128 having their outer ends secured to a circular or cylindrical member 130 and their inner ends secured to a peripheral flange 132 defining a neck opening 134 which receives the neck of the hog and which is generally oval-shaped in configuration with the shape being best illustrated in FIGURE 6. At the outer end of the head-receiving portion 126, there is provided a flexible cord or cable 136 having a loop-shaped handle 138 thereon attached to the cylindrical member 130 by any suitable fastening means 140 thereby a person may grasp the cable 136 and pull the head end gate 14 to its outermost position.

Figure 3:
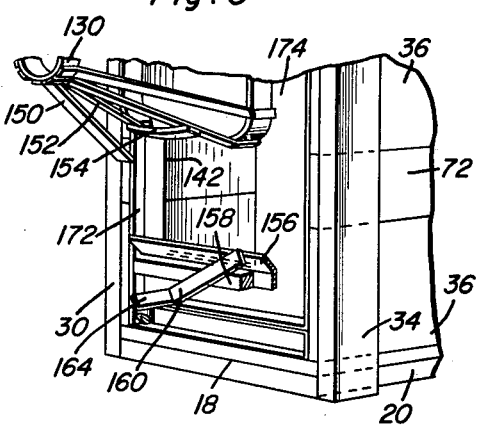
FIGURE 3 is a partial perspective view of the lower front portion of the hog crate illustrating the opening formed therein for enabling access to the throat or neck of the hog with the closure shield removed therefrom.

Extending downwardly from the neck-receiving opening 134 is an enlarged opening 142 closed by a shield member 144 that is wider than the opening 142 and provided with a handle 146 thereon. Also, the shield 144 has an upwardly extending angulated portion 148 received above a rod 150 and also engaging under a pair of shortened rods 152 having their ends rigidly secured together by an arcuate strap 154. The bottom of the shield 144 extends behind an upwardly and outwardly flared flange 156 secured in place by a transverse bar 158 which pivotally supports a latching member 160 by a pivot bolt 162. The latch member 160 has a footplate 164 on the bottom end thereof whereby the shield may be releasably secured in place and when the latch member 160 is pivoted to an angulated position as illustrated in FIGURE 3, the shield 144 may be removed for providing access to the throat of the hog positioned in the crate.

The periphery of the head end gate 14 is defined by angle iron members 166 which have a depending and upstanding axle pin 168 at one side edge thereof for reception in bearing sleeves 170 secured in place by welding or otherwise attaching to frame members 172 defining the opening for receiving the end gate 14.

Figure 4:
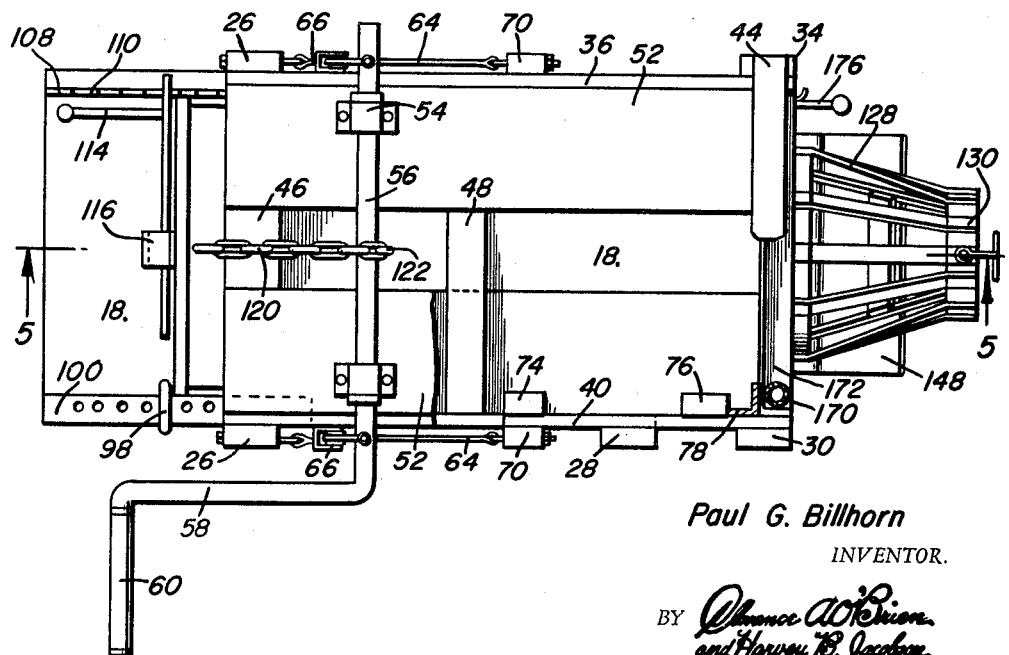
FIGURE 4 is a top plan view of the hog crate of the present invention with portions thereof broken away illustrating certain structural details.

A latch is provided for the end gate 14 which has a plate-like structure 174 outwardly of the flange 132 and the latch includes a pivotal crank-shaped handle 176 pivotally mounted on the front side of the crate and swingable to a position overlying a portion of the end gate. A lug 178 may be formed on the gate for frictionally retaining the latch 176 in place. By swinging the latch outwardly, the plate-like portion 174 of the end gate may swing outwardly in relation to the frame therefor all of which can move rearwardly by virtue of being attached to the movable members 72 as illustrated in FIGURE 4. Thus, the entire frame including the latch may be moved rearwardly and the latch cannot be released until such time as the neck end gate has been moved forwardly so that the latch member 176 can swing outwardly beyond the front side edge of the crate.

While the size of the crate may vary, it has been found that with the tail end gate shifted to its rearmost position, a crate having an inside length of fifty-five inches is adequate for most all hogs. When the rear end gate is in its forwardmost position, the crate will be approximately forty-nine inches. The neck can be pulled back as much as twelve inches thus reducing the inside length to thirty-seven inches thus enabling the hog to be held tight so that he cannot move for easier and safer working conditions regardless of the size of the hog.

The opening below the neck-receiving opening 134 may be approximately eight inches wide and seven inches in height to enable access to the neck of the hog to easier take blood for testing. The shield is in place to close the opening while the hog is being run into the crate so that he cannot run his nose through this opening. The fact that the front end gate can be swung out after completion of the operations is a time-saving factor since it is rather difficult to get the hogs to move rearwardly. All components of the hog crate are constructed of readily available materials, the wood components are of standard size construction and the various angle iron members, channel members, strap iron members and sheet metal members are all constructed from readily available materials with conventional means of fastening being employed. Bolts may be employed where desirable or the various components may be welded together where possible to provide the strongest possible construction.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A hog crate comprising a hollow housing including upright side walls and a floor extending therebetween, a head end gate attached to one end of the housing and forming a closure therefor, and a tail end gate attached to the other end of the housing and forming a closure therefor, said tail end gate being pivotally supported about a generally vertical axis for enabling the tail end gate to be moved to an open position for enabling ingress of hogs into the housing, said head gate having a forwardly projecting tapered portion for receiving the hog's head and being pivotally supported for enabling the head gate to be opened to enable egress of hogs after treatment, and means mounting the head gate on the housing for longitudinal reciprocation whereby the overall length of the housing may be varied.

2. The hog crate as defined in claim 1 wherein said tailgate is also longitudinally adjustably mounted on said housing for further enabling adjustment of the over-all length of the housing for receiving different length hogs for treatment.

3. The hog crate as defined in claim 2 wherein means is mounted on said housing for pulling the head gate towards the tailgate for shortening the length of the housing after entrance of a hog, said means including a winch structure and cooperating guide means between the housing and head gate for guiding the head gate during movement thereof towards the tailgate.

4. The hog crate as defined in claim 3 wherein said head gate is provided with handle means thereon to enable it to be pulled forwardly in the event the hog will not push the head gate forwardly when the means for moving the head gate rearwardly has been released.

5. The hog crate as defined in claim 4 wherein said head-receiving portion includes an enlarged opening for receiving the neck of a hog, a plurality of forwardly converging rods rigidly affixed thereto, an annular member interconnecting the outer ends of the rods and forming a space for receiving the snout of the hog thereby preventing movement of the hog during various treatments including the stabilization of the head of the hog during treatment thereof.

6. The hog crate as defined in claim 5 wherein said head gate is provided with an enlarged opening extending downwardly from the neckreceiving opening to enable access to be gained to the throat of the hog for facilitating blood sampling or the like.

7. The hog crate as defined in claim 6 together with a shield for temporarily closing the throat access opening to prevent the hog from placing his nose therein when entering the housing from the tailgate end thereof.

8. The hog crate as defined in claim 7 wherein a portion of said housing at one wall thereof adjacent the head gate is omitted to enable access to the hog in this area.

9. The hog crate as defined in claim 8 wherein the tailgate is provided with a transverse abutment adjacent the bottom but spaced upwardly from the floor to prevent the hog from sitting.

10. The hog crate as defined in claim 9 wherein said means for mounting the tailgate includes a top and bottom rail extending rearwardly from the housing, an elongated hinge rod extending through one of a plurality of aligned openings in the rails, said tailgate having hinge barrels thereon receiving the hinge rod for enabling the tailgate to be supported in adjusted position on the housing.

11. The hog crate as defined in claims 10 together with a rearwardly extending latch bar, notches in the upper edge of the latch bar, said latch bar being disposed at the opposite side of the tailgate from the hinge rod, and a latch member mounted on the tailgate for engagement with the notches on the latch bar thereby securing the tailgate releasably in place.

12. The hog crate as defined in claim 11 wherein said floor of the hog crate extends rearwardly to a position underlying the tailgate when in its rearmost position thereby retaining the hog in level condition.

References Cited by the Examiner
UNITED STATES PATENTS

| | | | |
|---|---|---|---|
| 882,647 | 3/08 | Nelson | 119—99 |
| 1,436,148 | 11/22 | Burris | 119—99 |
| 2,498,051 | 2/50 | Shipley | 119—99 |
| 3,051,127 | 8/62 | Norbury | 119—99 |
| 3,092,871 | 6/63 | Marshall et al. | 119—99 |

SAMUEL KOREN, *Primary Examiner.*

ALDRICH F. MEDBERRY, *Examiner.*